US011919822B2

(12) United States Patent
Chapman et al.

(10) Patent No.: US 11,919,822 B2
(45) Date of Patent: Mar. 5, 2024

(54) HONEYCOMB BODY MANUFACTURING METHODS

(71) Applicant: CORNING INCORPORATED, Corning, NY (US)

(72) Inventors: Thomas Richard Chapman, Painted Post, NY (US); Douglas Richard Wing, Corning, NY (US)

(73) Assignee: Corning Incorporated, Corning, NY (US)

( * ) Notice: Subject to any disclaimer, the term of this patent is extended or adjusted under 35 U.S.C. 154(b) by 642 days.

(21) Appl. No.: 17/058,471

(22) PCT Filed: May 30, 2019

(86) PCT No.: PCT/US2019/034559
§ 371 (c)(1),
(2) Date: Nov. 24, 2020

(87) PCT Pub. No.: WO2019/232152
PCT Pub. Date: Dec. 5, 2019

(65) Prior Publication Data
US 2021/0198156 A1    Jul. 1, 2021

Related U.S. Application Data

(60) Provisional application No. 62/678,797, filed on May 31, 2018.

(51) Int. Cl.
C04B 38/00     (2006.01)
B28B 11/24     (2006.01)
C04B 38/06     (2006.01)

(52) U.S. Cl.
CPC ........ *C04B 38/0006* (2013.01); *B28B 11/243* (2013.01); *B28B 11/248* (2013.01); *C04B 38/068* (2013.01)

(58) Field of Classification Search
CPC .... C04B 35/64; C04B 38/0675; C04B 38/068
See application file for complete search history.

(56) References Cited

U.S. PATENT DOCUMENTS 4,055,614 A * 10/1977 Morikawa ............ B01J 37/0018
264/630
6,287,509 B1 * 9/2001 Gheorghiu .......... C04B 38/0006
264/630

(Continued)

FOREIGN PATENT DOCUMENTS

EP    1808423 A1    7/2007
EP    2014630 A2    1/2009

(Continued)

OTHER PUBLICATIONS

International Search Report and Written Opinion of the International Searching Authority; PCT/US2019/034559; dated Nov. 12, 2019; 15 Pages; European Patent Office.

*Primary Examiner* — Erin Snelting
(74) *Attorney, Agent, or Firm* — Daniel J. Greenhalgh

(57) ABSTRACT

Methods of firing ceramic honeycomb bodies are disclosed that include heating the ceramic honeycomb bodies and blocking furnace gases from flowing through the ceramic honeycomb body by placing an aluminum metal layer adjacent an endface of the honeycomb body. Heating removes organic pore-forming material and graphite pore-forming material in the ceramic honeycomb body. The aluminum metal layer oxidizes to form a porous Al2O3 layer after firing to a first temperature, and furnace gases flow through the ceramic honeycomb body.

20 Claims, 6 Drawing Sheets

(56) References Cited

U.S. PATENT DOCUMENTS

| | | | |
|---|---|---|---|
| 7,225,538 B2 * | 6/2007 | Eldridge | ............ C25D 5/12 257/E21.507 |
| 8,808,613 B1 | 8/2014 | Yamayose | |
| 2007/0144561 A1 | 6/2007 | Saijo et al. | |
| 2008/0116621 A1 | 5/2008 | Brennan et al. | |
| 2009/0298670 A1 | 12/2009 | Murtagh et al. | |
| 2010/0130352 A1 | 5/2010 | Dabich et al. | |
| 2011/0127699 A1 | 6/2011 | Vayansky et al. | |

FOREIGN PATENT DOCUMENTS

| | | | |
|---|---|---|---|
| EP | 3202479 | A1 | 8/2017 |
| WO | 2016/179130 | A1 | 11/2016 |

* cited by examiner

HONEYCOMB BODY MANUFACTURING METHODS

This is a national stage application under 35 U.S.C. § 371 of International Application No. PCT/US2019/034559, filed May 30, 2019 which claims the benefit of priority under 35 U.S.C. § 119 of U.S. Provisional Application Serial No. 62/678,797 filed on May 31, 2018, the content of which is incorporated herein by reference in their entireties.

BACKGROUND

This disclosure generally relates to firing of ceramic honeycomb bodies that contain organic material and graphite as pore-forming materials. The pore-forming materials are removed during the firing process. There is a need to provide improved methods for removing pore-forming materials during firing of ceramic honeycomb bodies.

SUMMARY

A first aspect of this disclosure pertains to a method of firing a ceramic honeycomb body, the method comprising setting a ceramic honeycomb body comprising pore-forming materials comprising organic pore-forming material and graphite pore-forming material on a cookie in a furnace containing gases comprising oxygen; placing an aluminum metal layer between the cookie and the ceramic honeycomb body; and heating the ceramic honeycomb body to a temperature that burns out and removes at least a portion of the organic pore-forming material and the graphite pore-forming material.

A second aspect comprises the feature of heating the furnace to a temperature of up to 600° C. to remove at least a portion of the organic pore-forming material and heating the furnace to a temperature greater than 600° C. to remove the graphite pore-forming material. In a third aspect, the aluminum metal layer blocks gases in the furnace from flowing through the ceramic honeycomb body. In a fourth aspect, the aluminum metal layer is oxidized to form an $Al_2O_3$ layer after removal of at least a portion of the organic pore-forming material. In a fifth aspect, the $Al_2O_3$ layer is a porous layer that does not block furnace gases from flowing through the ceramic honeycomb body.

In a sixth aspect, the aluminum metal layer comprises aluminum in a range of 99.80-100% by weight, 99.950-100% by weight, in a range of 99.9960-100% by weight, or in a range of 99.9990-100% by weight. In a seventh aspect, the aluminum metal layer comprises aluminum in a range of 99.950-100% by weight.

In an eighth aspect, the aluminum metal layer comprises aluminum metal foil. In a ninth aspect, the aluminum metal layer comprises aluminum metal deposited on a sacrificial substrate. In a tenth aspect, the sacrificial substrate is selected from the group consisting of a paper sheet, a polymer sheet, and a plastic sheet. In an eleventh aspect, the cookie is placed on a flow-through setter. In a twelfth aspect, there is a second cookie is placed on the ceramic honeycomb body. In a thirteenth aspect, a second aluminum metal layer is placed between the ceramic honeycomb body and the second cookie.

A fourteenth aspect pertains to a method of firing a ceramic honeycomb body, the method comprising heating the ceramic honeycomb body comprising a first endface and a second endface and organic pore-forming material and graphite pore-forming material in a furnace containing gases comprise oxygen; and blocking the gases from flowing through the ceramic honeycomb body by placing an aluminum metal layer adjacent the first endface or the second endface. In a fifteenth aspect, comprises the feature of heating the furnace to a first temperature at which the organic pore-forming material are burned out and removed and oxidation of the aluminum metal layer forms a porous $Al_2O_3$ layer and heating the furnace to a second temperature that burns out and removes the graphite pore-forming material. In a sixteenth aspect, during heating the substrate to the second temperature burning out the graphite pore-forming material, furnace gases flow through the porous $Al_2O_3$ layer and the ceramic honeycomb body. In a seventeenth aspect, the first temperature is up to 600° C. and the second temperature is greater than 600° C.

In an eighteenth aspect, the ceramic honeycomb body is placed upon the aluminum metal layer disposed upon a cookie. In a nineteenth aspect, the cookie is place upon a setter. In a twentieth aspect, a second cookie is placed upon the ceramic honeycomb body.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

It will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

DETAILED DESCRIPTION

Figure 1:
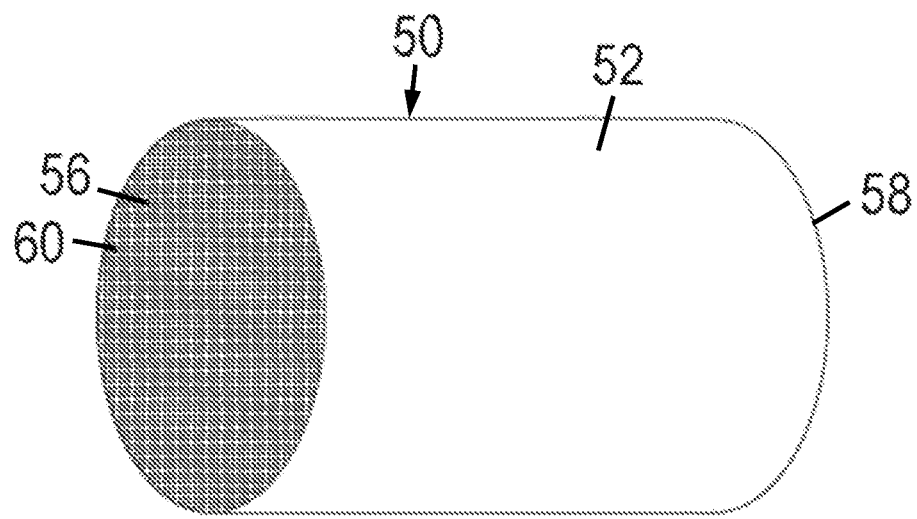
FIG. 1 is a perspective view of a honeycomb body according to one or more embodiments.

Before describing several exemplary embodiments, it is to be understood that the disclosure is not limited to the details of construction or process steps set forth in the following disclosure. The disclosure provided herein is capable of other embodiments and of being practiced or being carried out in various ways.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

During firing of ceramic honeycomb bodies that contain organic pore-forming material such as starches or polymers and graphite pore-forming material, the organic pore-forming material are removed at low temperatures in the firing process (e.g., up to 600° C.). During the removal of the organic pore-forming material, availability of oxygen to the honeycomb bodies should be limited to avoid the rapid burning of organics which leads to thermal runaway and cracking of the honeycomb bodies. The graphite burns at temperatures greater than 600° C., and graphite is burned out at temperatures near temperatures of about 1000° C. A ceramic honeycomb body is less sensitive to cracking at temperatures exceeding 600° C., where the ceramic honeycomb body has a lower modulus, a higher strain tolerance, and a lower shrinkage. Non-limiting examples of ceramic materials used to form the ceramic honeycomb body comprise cordierite, mullite, alumina, zirconia, silicon carbide, and aluminum titanate, and combinations thereof. It is desirable to maximize oxygen availability to the honeycomb body during graphite burnout to minimize the time to remove the graphite from the honeycomb body. The graphite removal rate is limited by the mass transport of oxygen to and $CO_2$ from the honeycomb body reaction interface. As used herein, unless otherwise specified, a "ceramic honeycomb body" prior to completion of firing the honeycomb body may comprise, in addition to other constituents, either one or more inorganic ceramic-forming precursor materials or one or more ceramic materials, or both inorganic ceramic-forming precursor materials and ceramic materials, and therefore the ceramic honeycomb body can be considered to be an "antecedent ceramic honeycomb body" which then transforms or becomes a fired ceramic honeycomb body after firing, for example via sintering or reactive sintering.

Prior to firing, the ceramic honeycomb body is set, which may aid in managing the uniformity of the flow of gas and thermal energy during the firing process. Setting the ceramic honeycomb body may, in certain exemplary embodiments, comprise placing the honeycomb body in a furnace such as a retort furnace configured to allow the reacting gases comprising oxygen to uniformly flow through all the channels of the ceramic honeycomb body and protecting the exposed sides of the ceramic honeycomb body. In additional exemplary embodiments, setting may comprise placing the ceramic honeycomb body on at least one diffuser box and protecting the exposed sides of the honeycomb body. In exemplary embodiments, setting may also comprise the use of at least one setter and/or cookie. In at least one exemplary embodiment, a "cookie" may be a thin slice of material, such as a thin slice of a ceramic, inorganic cement, or carbon-based honeycomb body. In certain exemplary embodiments, a "setter" may be an apparatus, such as a slab, on which the honeycomb body is mounted for firing. The setter may, in one embodiment, be of the same material as the honeycomb body which is being fired. In various additional embodiments, the honeycomb body may be on a setter, which may be on at least one diffuser box.

FIG. 1 illustrates exemplary embodiments of a ceramic honeycomb body 50 shown as a cylindrical shape having a cylindrical outer surface 52, an upstream end face 56 and a downstream end face 58. Ceramic honeycomb body 50 has a plurality of fine, parallel gas flow passages or channels 60 formed therein. The flow passages or channels 60 are formed by walls and extend through the ceramic honeycomb body 50 from upstream end face 56 to downstream end face 58, the flow passages 60 being unobstructed so as to permit the flow of a fluid, e.g., a gas stream, longitudinally through the ceramic honeycomb body 50 via gas flow passages or channels 60 thereof. In some embodiments, the ceramic honeycomb body 50 may have the structure of a wall flow filter where the gas flow passages are alternately plugged at the upstream end face 56 and downstream end face 58

Figure 2:
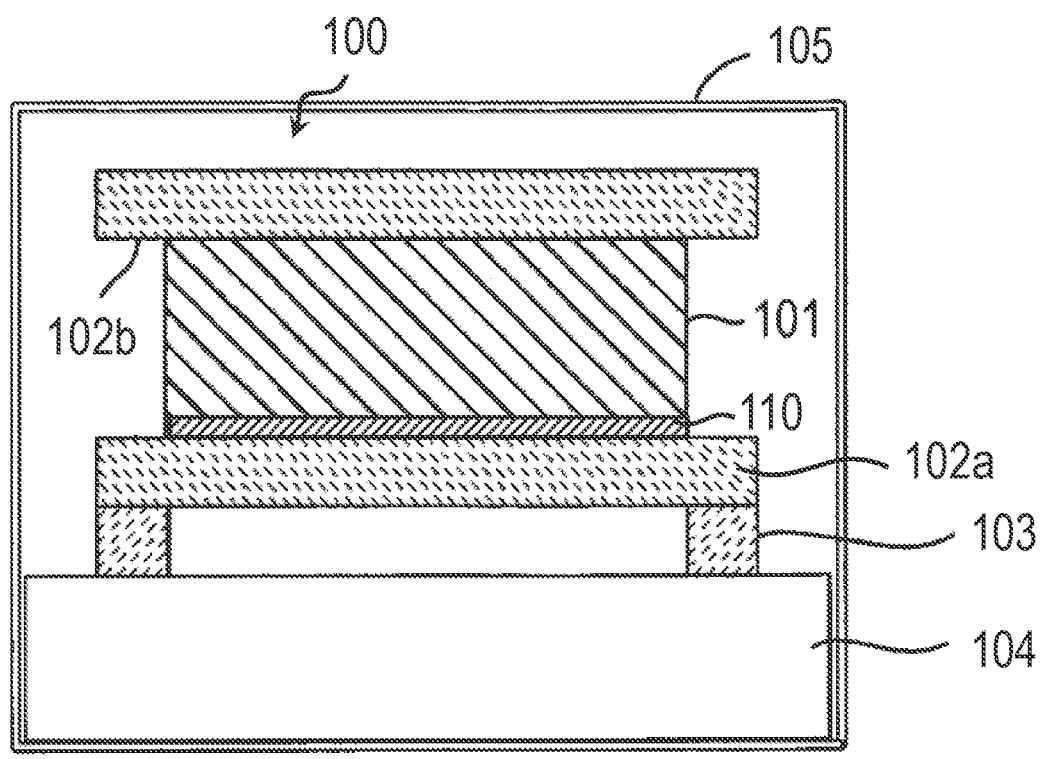
FIG. 2 schematically depicts a setter configuration in preparation for firing a ceramic honeycomb body in accordance with at least one exemplary embodiment.

FIG. 2 illustrates embodiments of the setter configuration 100. The ceramic honeycomb body 101 is placed on a first cookie 102a and a second cookie 102b is placed on top of the ceramic honeycomb body 101. In an exemplary embodiment of FIG. 2, the second cookie 102b sits upon a setter 103, which rests upon a diffuser box 104. The setter configuration 100 in FIG. 2 is placed inside a retort furnace 105.

One or more embodiments of the disclosure utilizes an aluminum metal layer 110, which can comprise a piece of aluminum metal foil or an aluminum metal layer coated on a sacrificial substrate such as a plastic sheet or a paper sheet, disposed between the first cookie 102a and the ceramic honeycomb body 101. As used herein, "aluminum metal" refers to aluminum in the metallic state and excludes compositions that include aluminum such as aluminum oxide ($Al_2O_3$) or aluminum titanate ($AlTi_2O_5$). In some embodiments the aluminum metal has a purity such that the aluminum content is in a range of 97.20-99.499% by weight, in a range of 99.50-99.79% by weight, in a range of 99.80-100% by weight (e.g., 99.80-99.949% by weight), in a range of 99.950-100% by weight (e.g., 99.950-99.9959% by weight), in a range of 99.9960-100% by weight (e.g., 99.9960-99.9990% by weight), or in a range of 99.9990-100% by weight. In one or more embodiments, the thickness of the aluminum-metal layer is in a range of from 10 to 150 micrometers (µm).

The cookie/layer/honeycomb body stack sits upon a plate or setter 103 that allows furnace gases to the flow through the bottom of the stack. In specific embodiments the setter 103 is a ring-shaped setter, which contains an opening to allow gases to pass therethrough. In other words, the ring-shaped setter is a flow-through setter. A ring-shaped setter comprises an annular ring with an opening therethrough. Other suitable examples of flow-through setters comprise a grid plate with openings therethrough and a crown setter with openings therethrough. In one or more embodiments, a "flow-through setter" is a setter with at least one opening therethrough that allows gas to pass through the setter and a honeycomb disposed above the flow-through setter. At low temperatures (e.g., less than 600° C., or up to 600° C.), the aluminum metal is in the metallic state and prevents the flow of furnace gases through the ceramic honeycomb body 101, limiting oxygen flux through the honeycomb body and preventing cracking. At higher temperatures (above 600° C.), the aluminum metal oxidizes and forms a thin, permeable layer of alumina ($Al_2O_3$), allowing furnace gases to flow through the ceramic honeycomb body 101, increasing oxygen flux through the ceramic honeycomb body 101 to aid in graphite removal.

Figure 3:
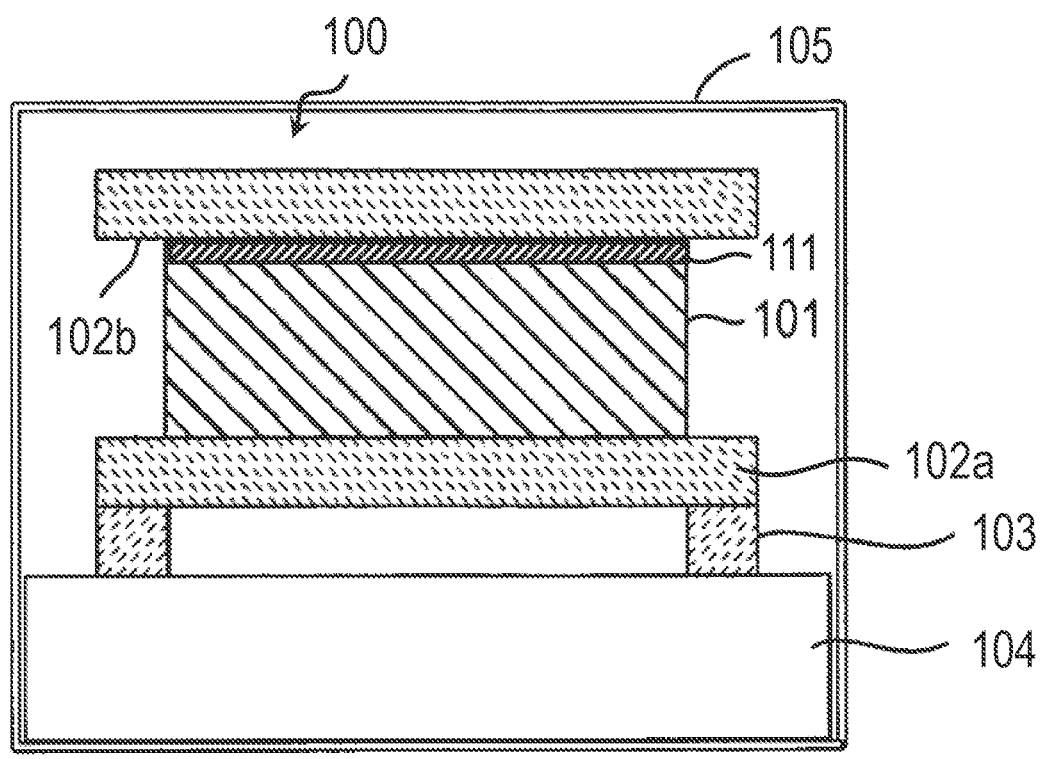
FIG. 3 schematically depicts a setter configuration in preparation for firing a ceramic honeycomb body in accordance with at least one exemplary embodiment.

In an alternative embodiments such as shown in FIG. 3, an aluminum metal layer 111, which can comprise a piece of aluminum metal foil or an aluminum metal layer coated on a sacrificial substrate such as a plastic sheet or a paper sheet, is disposed between the second cookie 102b and the ceramic honeycomb body 101. The honeycomb body/layer/cookie stack sits on a plate or setter 103 that allows furnace gases to the flow through the bottom of the stack. In specific embodiments, the setter 103 is a ring-shaped setter, which contains an opening to allow gases to pass therethrough. In other words, the ring-shaped setter is a flow-through setter.

Figure 4:
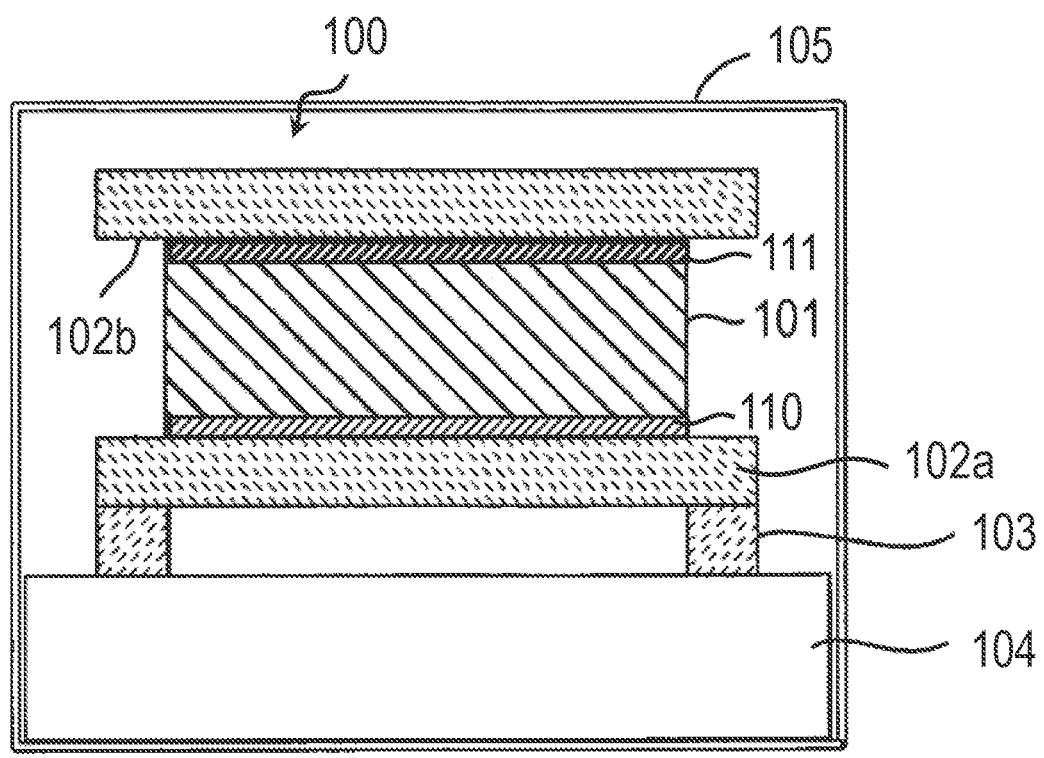
FIG. 4 schematically depicts a setter configuration in preparation for firing a ceramic honeycomb body in accordance with at least one exemplary embodiment.

In other alternative embodiments such as shown in FIG. 4, an aluminum metal layer 110, which can comprise a piece of aluminum metal foil or an aluminum metal layer coated on a sacrificial substrate such as a plastic sheet or a paper sheet, is disposed between the first cookie 102a and the ceramic honeycomb body 101. In addition, a second aluminum metal layer 111, which can comprise a piece of aluminum metal foil or an aluminum metal layer coated on a sacrificial substrate such as a plastic sheet a paper sheet, is disposed between the second cookie 102b and the ceramic honeycomb body 101. The cookie/layer/honeycomb body/cookie stack sits on a plate or setter 103 that allows furnace gases to the flow through the bottom of the stack. In certain embodiments the setter 103 is a ring-shaped setter, which contains an opening to allow gases to pass therethrough. In other words, the ring-shaped setter is a flow-through setter.

In alternative embodiments, an aluminum metal sheet, which can comprise a piece of aluminum metal foil or an aluminum metal layer coated on a sacrificial substrate such as a plastic sheet or a paper sheet, could also be wrapped about the circumference of the ceramic honeycomb body 101 if an additional boundary from the furnace atmosphere is desired.

According to one or more embodiments of the methods described herein, the methods allow for a reduced firing cycle time compared to processes that do not utilize an aluminum metal layer placed between the honeycomb body and the cookie.

Embodiments of the disclosure utilize an aluminum metal layer such as aluminum metal foil or an aluminum metal layer coated on a sacrificial substrate such as a plastic sheet or a paper sheet disposed between the cookie and the honeycomb body. Aluminum metal has a melting point of about 660° C., though it readily oxidizes at this temperature, forming alumina ($Al_2O_3$). At temperatures less than 600° C. (or up to 600° C.), the aluminum metal is in the metallic state, and the layer prevents the flow of gases in the furnace from flowing through the honeycomb body. When the aluminum metal in the aluminum metal layer is in the metallic state, oxygen flux through the honeycomb body is limited, which prevents cracking. At temperatures greater than 600° C., the aluminum metal oxidizes and forms a thin, permeable layer of alumina ($Al_2O_3$), allowing furnace gases to flow through the honeycomb body, increasing oxygen flux through the honeycomb body to aid in graphite removal. In one or more embodiments, the setter configuration is a dynamic setter configuration, and one of the components of the setter configuration, the aluminum metal layer is dynamic, blocking furnace gases from flowing through the honeycomb body during a first pore-forming material burnout phase, and not blocking furnace gases from flowing through the honeycomb body during a second pore-forming material burnout phase. In one or more embodiments, a dynamic setter comprises a flow-through setter as defined herein combined with an aluminum metal layer that acts as barrier that can restrict the mass transport of oxygen through the channels while the organic pore-forming material is being removed from the honeycomb body, avoiding a "chimney effect" which may drives thermal runaways and cracking in honeycomb bodies with high organic content. This barrier then oxidizes, forming an alumina sheet, allowing for oxygen and heat convection through the honeycomb body, to promote graphite pore-forming material removal at higher temperatures.

This process configuration according to embodiments of the disclosure may also lead to an improvement in physical property uniformity of the fired honeycomb bodies. Delayed graphite burnout can lead to a disruption in the property formation of a cordierite honeycomb body. Allowing flow through the honeycomb body is expected to result in a more robust process window for graphite removal. While the disclosure and claims should not be limited by a particular principle or theory, it is believed that this improvement is achieved as a result of convective flow of the oxygen from the kiln atmosphere to the center of the part, as well as the flow of CO and $CO_2$ from the center of the part into the kiln atmosphere, rather than diffusion limited flow into and out of the parts when one end of the filter is completely blocked to gas flow. Additionally, in current process configuration which do not utilize an aluminum metal layer between the honeycomb body and the cookie, there is within-part property variability imparted in large cordierite honeycomb wall-flow filters as a result of heat being trapped in the core of the honeycomb body during the cordierite formation exotherm. Allowing flow of furnace gas though the honeycomb body during cordierite formation could reduce the amount of heat buildup, reducing the physical property differences between the core and the skin on the honeycomb body.

Aluminum titanate honeycomb bodies could also benefit from within-part property uniformity. The reaction sequence to form $AlTi_2O_5$ may or may not go through an intermediate step of forming $SrTiO_3$. The thermodynamic stability of this phase is dependent on $pO_2$ (the partial pressure of oxygen), which could differ between skin and core and must be managed for uniform properties.

The aluminum metal layer can comprise aluminum metal foil. Consumer grade aluminum metal foil is an alloy that contains manganese, copper, iron and other trace elements. These metals prevent the complete conversion of the foil to alumina and result in patches of metallic residue post-firing. These patches can be sliced or ground off of the face of the honeycomb body. In one or more embodiments, a pure form of aluminum metal foil is utilized. Electronic grade aluminum metal foil can be obtained at aluminum metal content in a range of 99.80-100% by weight (e.g., 99.80-99.949% by weight), in a range of 99.950-100% by weight (e.g., 99.950-99.9959% by weight), in a range of 99.9960-100% by weight (e.g., 99.9960-99.9990% by weight), or in a range of 99.9990-100% by weight. The cost of electronic grade aluminum metal foil may be expensive for certain applications. In some embodiments, a more cost effective solution is a sacrificial substrate such as a plastic sheet, a paper sheet or a polymer sheet vacuum-coated (e.g., by chemical vapor deposition (CVD), plasma enhanced chemical vapor deposition (PECVD), physical vapor deposition (PVD), sputtering or atomic layer deposition (ALD)) with an aluminum metal layer. The sacrificial substrate, such as the plastic, polymer, or paper sheet will burn off in the same temperature region as the organic pore-forming agents in the body, leaving behind a thin layer of high purity aluminum metal.

According to various embodiments, the setter configuration, including the honeycomb body, is placed in an apparatus for firing, such as a furnace. In some embodiments, the furnace may be a small retort chamber or a large retort chamber. Firing may be done by any method known to those of skill in the art. According to various exemplary embodiments, firing may comprise heating the honeycomb body and may optionally further comprise flowing at least one inert or oxidizing gas through the honeycomb body. The honeycomb body may be fired to achieve heat treatment and/or oxidation of the honeycomb body.

According to one or more embodiments, the honeycomb body may be fired by heating with process gas flow. The amount of process gas flow through the honeycomb body may, for example, be adjusted by input gas flow rates and/or amount of exhaust gas vented. In certain embodiments, process gas flow temperature may be controlled by managing the furnace temperature ramp rate. The appropriate temperature, furnace ramp rate, process gas flow rate, and/or length of soak time in the process gas(es) may be determined by those of skill in the art, and may be determined at least in part based upon the properties desired in the final product. For example, process temperatures up to about 1000° C. may be used, with soak times often ranging from a few minutes to many hours. "Soak time" refers to the period of time the furnace is held at an elevated temperature during the firing process. In addition, the temperature, furnace ramp rate, process gas flow rate, and/or length of soak time may be dependent upon one another. For example, when the temperature of the firing or gas flow rate is higher, the length of soaking may be shorter, or when the temperature or gas flow rate is lower, the length of soak time may be greater, etc. One of skill in the art may, in certain embodiments, choose the temperature, length of firing, and soak time based upon other variables as well, and these determinations are well within the ability of those skilled in the art to make.

In some embodiments, the methods comprise heat treatment and/or controlled oxidation of at least one honeycomb body, wherein the process gas flows through the passages or channels of the honeycomb body from the inlet end to the outlet end.

Examples

Figures 5A, 5B, 5C:
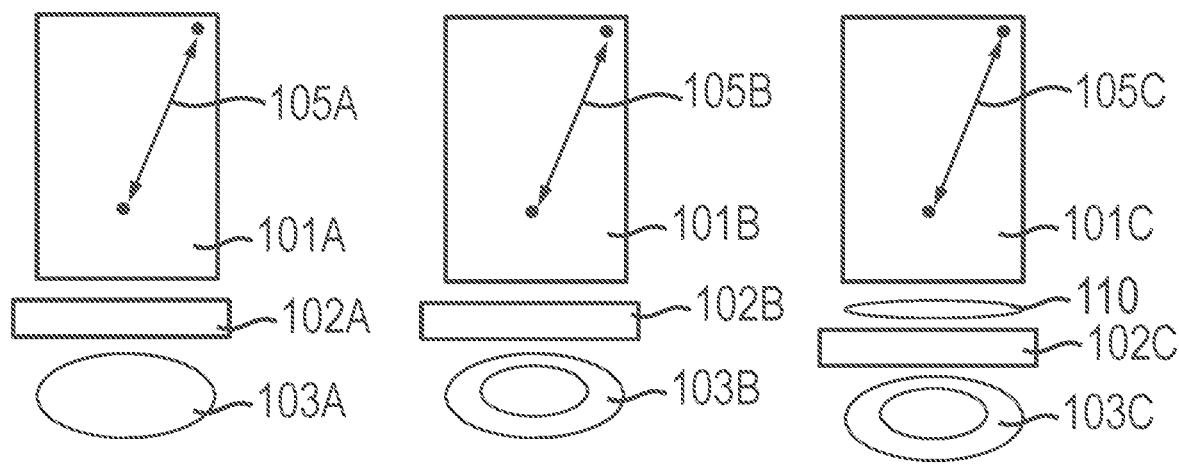
FIGS. 5A-C schematically depict setter configurations that were utilized for the generation of data in the Examples.

Experiments were conducted with honeycomb bodies 101A, 101B, and 101C shown in FIGS. 5A, 5B and 5C respectively. All three honeycomb bodies represented FIGS. 5A, 5B, and 5C were the same size; 13 inches tall and 13 inches in diameter, and of the same composition; 15 weight % pore-former (starch and graphite combined) at approximately 3:1 starch to graphite ratio. Additionally these parts comprise organic binder at about 3.5 wt %, which burns out during the debind region of the cycle. In the schematic representation shown in FIG. 5A, honeycomb body 101A was placed upon cookie 102A, which was placed upon disc-shaped setter 103A made of silicon carbide with an outer diameter of 9 inches and approximately 0.45 inches thick. The cookie 102A was a thin piece of honeycomb body, approximately 0.75 inches thick, having the same composition as the honeycomb body 101A. Honeycomb body 101A comprises 10% by weight pore-forming materials comprising starch and graphite in a range of about 3:1 to 1:1 starch to graphite. Thermocouple 105A was placed on the honeycomb body 101A to monitor temperature. FIG. 5A represents a prior art setter configuration.

FIG. 5B schematically represents a second prior art setter configuration in which honeycomb body 101B was placed upon cookie 102B, which was a thin piece of honeycomb body, approximately 0.75 inches thick, having the same composition as the honeycomb body 101B. The setter 103B in FIG. 5B is a ring-shaped setter, which contains an opening to allow gases to pass therethrough. In other words, the ring-shaped setter is a flow-through setter made of silicon carbide with an outer diameter of 9 inches, an inner diameter of 4 inches and approximately 0.45 inches thick. Thermocouple 105B was placed on the honeycomb body 101B to monitor temperature.

FIG. 5C represents a setter as disclosed herein configuration according to embodiments in which honeycomb body 101C was placed upon cookie 102C, which was a thin piece of honeycomb body, approximately 0.75 inches thick having the same composition as the honeycomb body 101C. The setter 103C in FIG. 5C is a ring-shaped setter, which contains an opening to allow gases to pass therethrough. In other words, the ring-shaped setter is a flow-through setter made of silicon carbide with an outer diameter of 9 inches, an inner diameter of 4 inches and approximately 0.45 inches thick. In FIG. 5C, the aluminum metal layer 110 is a thin piece of aluminum metal foil, a 9 inch diameter disc approximately 0.0009 inches thick and of 97.20-99.499% by weight aluminum content was placed between the cookie 102C and the honeycomb body 101C. Thermocouple 105C was placed on the honeycomb body 101C to monitor temperature.

Figure 6:
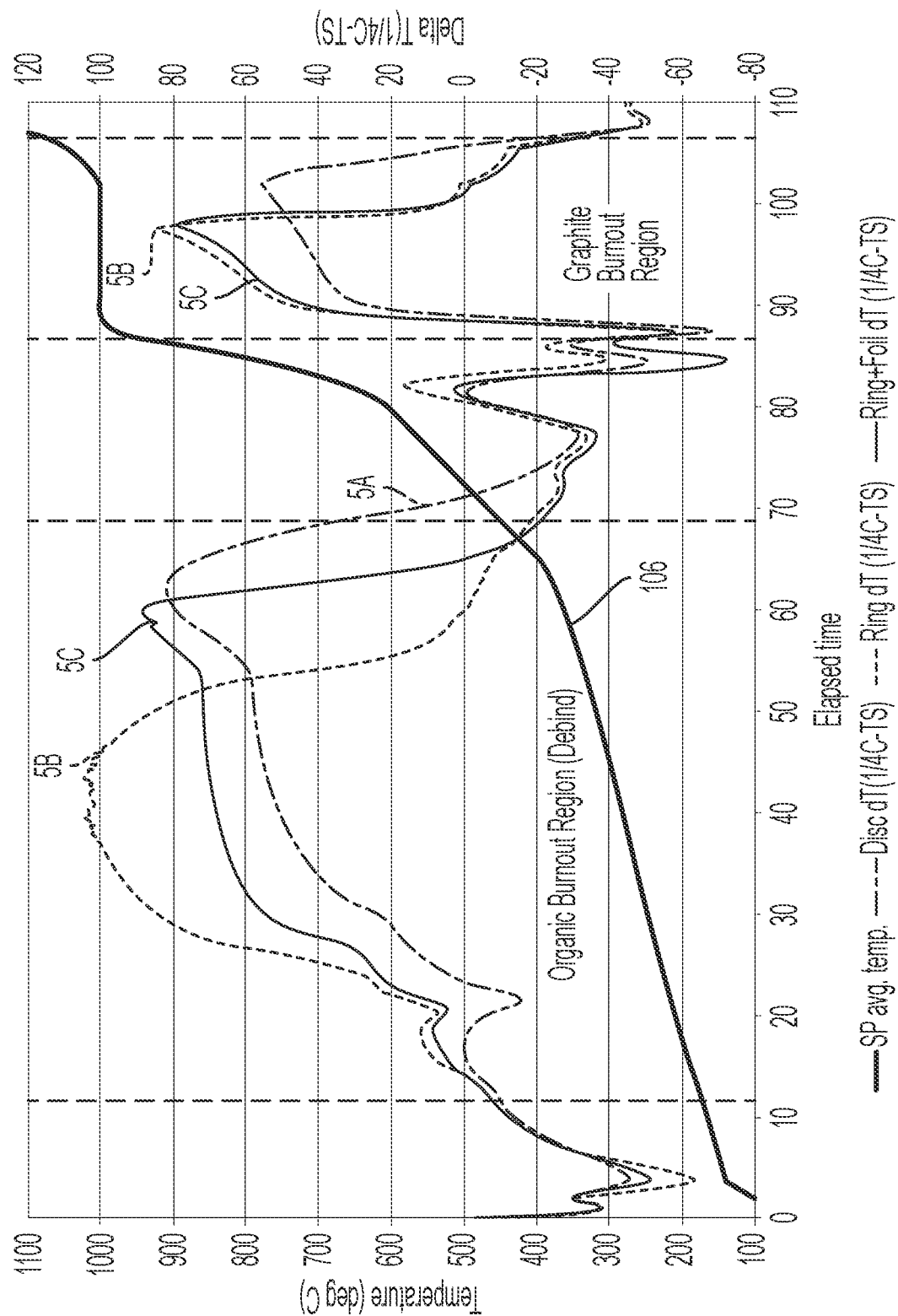
FIG. 6 is a graph of data from the Examples showing the temperature profile of the honeycomb bodies in the setter configurations of FIGS. 5A-C.

Each of the setter configurations in FIGS. 5A, 5B, and 5C was heated according to the temperature set point shown in FIG. 6 to burn out the pore-forming materials, comprised of a vegetable-based starch and a graphite powder. FIG. 6 shows the average set point temperature of the furnace (line labeled 106), and the thermocouple data for each of the honeycomb bodies of FIG. 5A, FIG. 5B, and FIG. 5C. In FIG. 6, the X-axis represents time in hours. The data corroborates with the setter configuration of FIG. 5C disclosed herein having prevented the flow of furnace gases through the honeycomb body 101C during burn out of the organic pore-forming material, as discussed further below.

In the debind region of FIG. 6, the configuration shown in FIG. 5B exhibited a high Delta T in the organic burnout region approximately from 25 to 50 hours, fueled by oxygen flux to the core of the honeycomb body 101B. This condition often leads to cracking of the honeycomb body. The configuration of FIG. 5C showed a closer resemblance to the configuration of FIG. 5A, which utilized a disc setter. The Delta T for the configuration of FIG. 5C is somewhat greater than the configuration of FIG. 5A, but the configuration of FIG. 5C does not exhibit the thermal runaway of the configuration of FIG. 5B. In the configuration of FIG. 5C, during the graphite burnout, the aluminum metal foil has decomposed and the graphite burnout of the configuration of FIG. 5C is the same as graphite burnout for the configuration of FIG. 5B. The configuration of FIG. 5A utilizing a disc-shaped setter that is not a flow-through setter requires an approximately extra 5 hours (about 105 hours for 5A vs. about 100 hours for 5C) to complete the graphite burnout in comparison to the configuration of FIG. 5B and FIG. 5C.

It will be apparent to those skilled in the art that various modifications and variations can be made without departing from the spirit or scope of the disclosure.

What is claimed is:

1. A method of firing a ceramic honeycomb body, the method comprising:
setting a ceramic honeycomb body comprising an outer surface extending between opposed endfaces and organic pore-forming material and graphite pore-forming material on a cookie in a furnace containing gases comprising oxygen;

placing an aluminum metal layer between the cookie and at least one of the opposed endfaces of the ceramic honeycomb body, the outer surface not covered by the aluminum metal layer; and heating the ceramic honeycomb body to a temperature that burns out and removes at least a portion of the organic pore-forming material and the graphite pore-forming material.

2. The method of claim 1, wherein heating the ceramic honeycomb body comprises heating the furnace to a temperature of up to 600° C. to remove at least a portion of the organic pore-forming material and heating the furnace to a temperature greater than 600° C. to remove the graphite pore-forming material.

3. The method of claim 2, wherein the aluminum metal layer blocks gases in the furnace from flowing through the ceramic honeycomb body.

4. The method of claim 2, wherein the aluminum metal layer is oxidized to form an $Al_2O_3$ layer after removal of at least a portion of the organic pore-forming material.

5. The method of claim 4, wherein the $Al_2O_3$ layer is a porous layer that does not block furnace gases from flowing through the ceramic honeycomb body.

6. The method of claim 1, wherein the aluminum metal layer comprises aluminum in a range of 99.80-100% by weight.

7. The method of claim 6, wherein the aluminum metal layer comprises aluminum metal foil.

8. The method of claim 1, wherein the aluminum metal layer comprises aluminum in a range of 99.950-100% by weight.

9. The method of claim 1, wherein the cookie is placed on a flow-through setter.

10. The method of claim 9, wherein a second cookie is placed on the ceramic honeycomb body.

11. The method of claim 10, wherein a second aluminum metal layer is placed between the ceramic honeycomb body and the second cookie.

12. A method of firing a ceramic honeycomb body, the method comprising:
setting a ceramic honeycomb body comprising pore-forming materials comprising organic pore-forming material and graphite pore-forming material on a cookie in a furnace containing gases comprising oxygen;

placing an aluminum metal layer between the cookie and the ceramic honeycomb body, wherein the aluminum metal layer comprises aluminum metal deposited on a sacrificial substrate; and heating the ceramic honeycomb body to a temperature that burns out and removes at least a portion of the organic pore-forming material and the graphite pore-forming material.

13. The method of claim 12, wherein the sacrificial substrate is selected from the group consisting of a paper sheet, a polymer sheet, and a plastic sheet.

14. A method of firing a ceramic honeycomb body, the method comprising:
heating the ceramic honeycomb body comprising a first endface and a second endface and an outer surface extending between the first and second endfaces and organic pore-forming material and graphite pore-forming material in a furnace containing gases comprising oxygen; and blocking the gases from flowing through the ceramic honeycomb body by placing an aluminum metal layer adjacent the first endface or the second endface, the outer surface not covered by the aluminum metal layer.

15. The method of claim 14, further comprising heating the furnace to a first temperature at which the organic pore-forming material is burned out and removed and oxidation of the aluminum metal layer forms a porous $Al_2O_3$ layer and heating the furnace to a second temperature that burns out and removes the graphite pore-forming material.

16. The method of claim 15, wherein during heating the furnace to the second temperature burning out the graphite pore-forming material, furnace gases flow through the porous $Al_2O_3$ layer and the ceramic honeycomb body.

17. The method of claim 16, wherein the first temperature is less than or equal to 600° C. and the second temperature is greater than 600° C.

18. The method of claim 16, wherein the ceramic honeycomb body is placed upon the aluminum metal layer disposed upon a cookie.

19. The method of claim 18, wherein the cookie is placed upon a setter.

20. The method of claim 19, wherein a second cookie is placed upon the ceramic honeycomb body.

* * * * *